Figure 1:
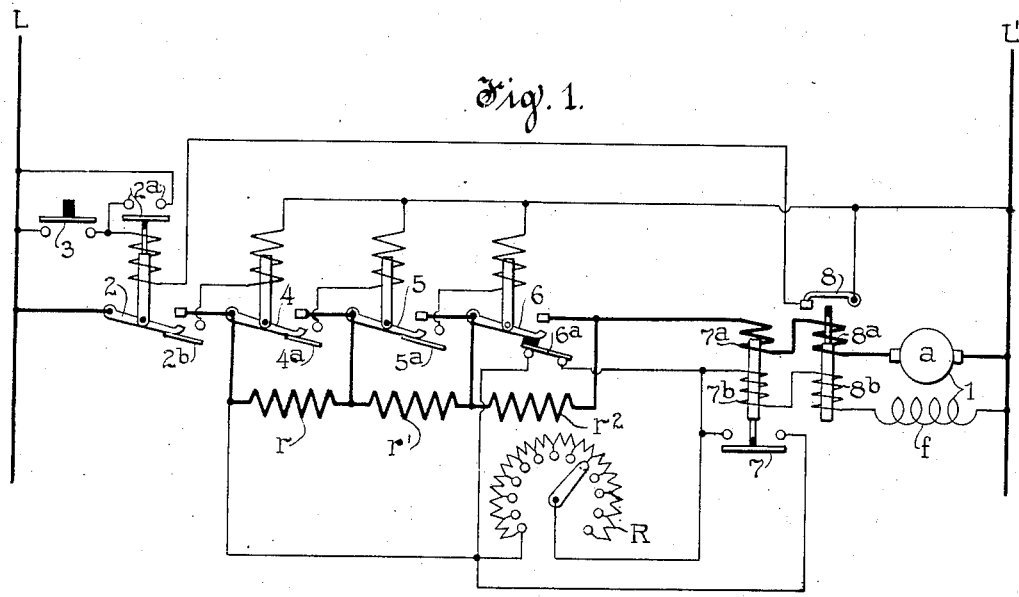

C. E. CARPENTER.
MOTOR CONTROLLER.
APPLICATION FILED OCT. 5, 1916.

1,378,010.

Patented May 17, 1921.

INVENTOR.
Charles E. Carpenter
BY Frank H. Hubbard
ATTORNEY

UNITED STATES PATENT OFFICE.

CHARLES E. CARPENTER, OF NEW YORK, N. Y., ASSIGNOR TO THE CUTLER-HAMMER MFG. CO., OF MILWAUKEE, WISCONSIN, A CORPORATION OF WISCONSIN.

MOTOR-CONTROLLER.

1,378,010.

Specification of Letters Patent.   Patented May 17, 1921.

Application filed October 5, 1916.   Serial No. 123,801.

*To all whom it may concern:*

Be it known that I, CHARLES E. CARPENTER, a citizen of the United States, residing at New York, in the county of New York and State of New York, have invented new and useful Improvements in Motor-Controllers, of which the following is a full, clear, concise, and exact description, reference being had to the accompanying drawing, forming a part of this specification.

This invention relates to controllers for electric motors variable in speed by field regulation.

As is understood, field weakening of a shunt motor ordinarily results in an increased flow of current in the armature circuit thereof due to the increased speed of the motor and its consequent greater output and initial inclusion of the field weakening means tends to cause the armature current to rise momentarily above its ultimate value. To limit the surges of current in the armature circuit during the field weakening period it has been proposed to utilize a so-called "fluttering" or "vibrating" relay responsive to the motor armature current for intermittently excluding the field weakening means until the motor attains a speed corresponding to the ultimate degree of field weakening. In some instances, however, such a relay permits the controlled motor to develop an abnormal torque during the accelerating period with the result of subjecting the driven mechanism to excessive strains. This is due to the fact that the relay which is of constant sensitiveness to armature current must be calibrated to remain inert during such an increase in the armature current as is permissible at any instant during the accelerating period, whereas in permitting such an increase in current during the initial part of the accelerating period, or, in other words, before the field strength is materially reduced, the motor is frequently allowed to develop a torque materially greater than its normal torque. Moreover, due to the variation in armature current resulting from field weakening, much difficulty has been experienced in providing for adequate overload protection of motors of the type discussed.

The present invention has among its objects to provide a controller which will afford field regulation of the motor in a manner similar to that described but with a curtailment of torque during the accelerating period and which will further afford varying overload protection for the motor as the acceleration thereof by field regulation progresses.

A further object is to provide field regulating means and overload means both functionally related to the motor field whereby the condition of the field will, to a certain extent, govern the action thereof.

Various other objects and advantages of the invention will hereinafter appear.

The accompanying drawing illustrates diagrammatically one embodiment of the invention which will now be described, it being understood that the controller illustrated is susceptible of various modifications without departing from the scope of the appended claims.

Figure 2:
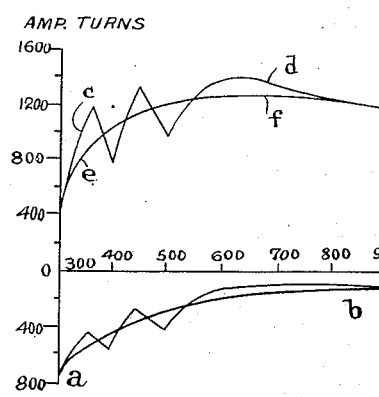
Figure 3:
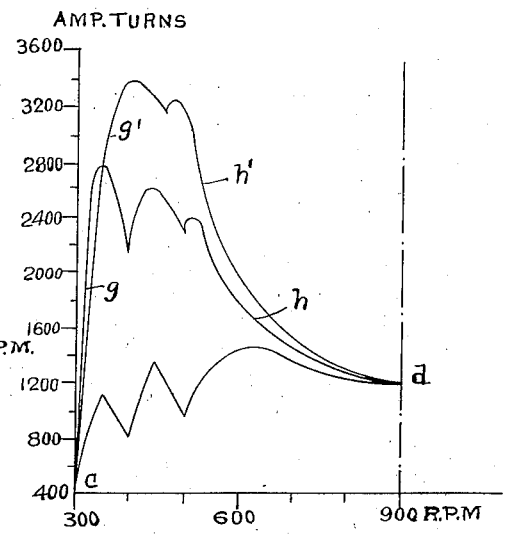

In the drawing,

Figure 1 diagrammatically illustrates the controller connected to an electric motor;

Fig. 2 shows curves illustrative of the action of certain switches embodied in the controller of Fig. 1; while, Fig. 3 illustrates graphically certain additional operative characteristics of such controller as distinguished from the control means ordinarily employed.

Referring to Fig. 1, the same shows a motor 1 having an armature $a$ and a shunt field winding $f$, said motor to be accelerated to normal speed by progressive exclusion of armature resistances $r$, $r'$ and $r^2$ and to be further accelerated by inclusion of a field rheostat R.

An electro-responsive switch 2, under the control of a push button switch 3, is provided to complete the motor circuit from line L to line L' through the resistance $r$ to $r^2$, while electro-responsive switches 4, 5 and 6 are provided to exclude said resistances progressively. Switch 6 is also provided with auxiliary contacts $6^a$ normally short-circuiting the field rheostat and serving to include said rheostat in circuit upon excluding the last step of armature resistance $r^z$.

The switch 2 has auxiliary contacts $2^a$ for establishing a maintaining circuit for itself in shunt with the push button switch 3 and said switch 2 is also provided with auxiliary contacts $2^b$ to establish the energizing circuit of switch 4. Switch 4 in turn has auxiliary contacts $4^a$ to establish the energizing circuit of switch 5 while switch 5 has auxiliary contacts $5^a$ to establish the energizing circuit of switch 6, whereby the response of the accelerating switches is both progressive and automatic upon closure of main switch 2.

The field regulating means comprises a vibrating relay 7 controlling a second short circuit around the field rheostat R and the overload protective means comprises an electro-responsive switch 8 included in series with the winding of switch 2. Both the relay 7 and overload switch 8 are provided with two cumulative windings, the windings $7^a$ and $8^a$ of said switches comprising a relatively small number of turns of heavy wire and being connected in series with the motor armature, and the windings $7^b$ and $8^b$ of said switches comprising a greater number of turns of fine wire and being connected in series with the motor field. Thus, except for the difference in calibration of the two switches and the vibrating action of the switch 7, said switches function in the same manner.

Considering the relay 7, and more particularly its winding $7^b$, said winding is so connected as to be subjected to variations in the field current with the result that its magnetizing force is at a maximum prior to initial inclusion of the field rheostat and is gradually decreased as the field is weakened by intermittent inclusion of the field rheostat. Accordingly, as the winding is cumulative with the winding $7^a$, the magnetizing force required of the latter to effect response of the relay increases as that of the former decreases. In other words, the two windings acting cumulatively provide for a gradual decrease in the sensitiveness of the relay to surges of armature current as the weakening of the field progresses, and thus the relay tends to restrict the armature current to a gradual increase during the accelerating period, thereby holding down the torque developed by the motor accordingly.

Likewise the windings of the overload switch acting cumulatively provide for a gradual decrease in the sensitiveness of said switch to surges of armature current as the weakening of the field progresses. Moreover as the windings of both the relay and overload switch are subjected to the same current variations, they are also subject to like variations in sensitiveness whereby a definite relation is maintained therebetween throughout the accelerating period. In other words, with the overload switch calibrated for less sensitiveness than the relay, response of the former may be made dependent upon a definite increase in armature current above the value at which the relay is then responsive.

Referring now to Fig. 2, the same graphically depicts by curves $a$—$b$, $c$—$d$ and $e$—$f$ the variations in sensitiveness of the relay and overload switch to surges of armature current, said curve $a$—$b$ representing in ampere turns of the windings $7^b$ and $8^b$ the reduction in field current as the speed of the motor is increased by the field rheostat and said curve $c$—$d$ representing in ampere turns of the relay winding $7^a$ the resulting surges of armature current. Thus assuming the relay to be calibrated for response at 1600 ampere turns of which the winding $7^b$ connected in the field circuit furnishes 700 ampere turns at maximum field strength and further assuming the curve $c$—$d$ to start at approximately 400 ampere turns upon initial inclusion of the field rheostat, the initial response of the relay is obtained when the curve $c$—$d$ rises to approximately 1200 ampere turns, assuming the curve $a$—$b$ in the meantime to have receded toward the zero line to approximately 400 ampere turns. In other words, this relay as compared with an ordinary relay of like calibration curtails the initial surge of armature current by an amount corresponding to 400 ampere turns. On the other hand while the curve $c$—$d$ recedes prior to release of the relay the curve $a$—$b$ increases slightly in value, but following release of the relay, again recedes below its former low value and hence the relay after release thereof remains inert until the curve $c$—$d$ exceeds 1300 ampere turns, assuming the curve $a$—$b$ to have receded to 300 ampere turns. While upon the next and last accretion of armature current the relay does not respond since the combined value of the shunt and series ampere turns is then less than 1600. Thus the curve $e$—$f$ which is drawn parallel to the general direction of the curve $c$—$d$ is seen to be substantially parallel also to a smooth line similarly drawn with respect to the curve $a$—$b$, whereby it is apparent that the relay tends to reduce variations in torque throughout the period of acceleration by field regulation.

This control characteristic is more fully depicted in Fig. 3 wherein the curve $c$—$d$ corresponds to the similarly designated curve of Fig. 2, the curve $g$—$h$ illustrates the variations in torque under the instant system of regulation during the period aforementioned, while the curve $g'$—$h'$ is exemplary of the torque variations under like conditions but where only ordinary regulating means are employed.

Upon comparison of said torque curves, it is apparent that practically every point of the curve $g$—$h$ is materially lower than the corresponding point of the curve $g'$—$h'$, which difference is most marked during those portions of the curves representing the higher torque values, whereby the curtailment of excessive torque effected by the relay particularly at the beginning of the acceleration by field regulation is apparent. It is further to be noted that the maxima and minima of the curve $g$—$h$ occur at speed values simultaneous with the corresponding portions of the armature ampere turn curve $c$—$d$ and with the corresponding minima and maxima respectively of the field ampere turn curve $a$—$b$.

As above stated, the curve $a$—$b$ also represents the variations in ampere turns of the winding $8^b$ of the overload switch and thus as represented by the curve $e$—$f$ the number of ampere turns required of the winding $8^a$ for operation of said switch increases with the decrease in ampere turns of the former winding, whereby the curve $e$—$f$ substantially parallels both the curve $a$—$b$ and the aforesaid curve drawn through peaks of curve $c$—$d$. Hence, for example, if the overload switch is calibrated for response at 1700 ampere turns and the relay at 1600 ampere turns, the former remains inert so long as the latter functions as described to hold down the peaks of armature current. On the other hand, as represented by curve $e$—$f$, the overload switch remains responsive to any surge of armature current exceeding by 100 ampere turns or more the peak limit of the relay for the same instant.

It is, of course, understood that both the relay and overload switch may be adjusted in numerous ways as by varying the number of turns of the coils, varying the air gaps in the magnetic circuits, or by the usual tension devices.

Further it is to be understood that the shunt windings of both the field relay and overload switch might be connected in circuit with the motor field winding in other ways without departing from the scope of the present invention.

What I claim as new and desire to secure by Letters Patent is:

1. The combintion with a motor variable in speed by field regulation, of control means therefor having control windings connected in different branches of the circuit of said motor one being in series with the armature of said motor, said windings providing for variation of the sensitiveness of said control means to variations in armature current according to the field regulation of said motor.

2. The combination with a motor variable in speed by shunt field regulation, of electro-responsive control means therefor having control windings respectively connected in the armature and shunt field circuits of said motor, said windings coöperating to vary the sensitiveness of said control means in accordance with variations in the speed of said motor effected by shunt field regulation.

3. The combination with a motor variable in speed by shunt field regulation, of electro-responsive control means therefor having cumulative control windings respectively connected in the armature and shunt field circuits of said motor.

4. The combination with a motor variable in speed by field regulation, of means tending to limit the armature current of said motor during the period of field regulation, said means being automatically adjustable during such period as to its limitation of armature current and automatically adjustable means to interrupt the motor circuit upon a predetermined increase of armature current above the then established limit of said former means.

5. The combination with a motor variable in speed by field regulation, of a field controlling relay and an overload device both sensitive to armature current variations and said relay and said overload device having means to correspondingly vary their sensitiveness to armature current variations as the speed of said motor is changed by field regulation.

6. The combination with a motor variable in speed by shunt field regulation, of a field controlling relay and an overload device, each having cumulative windings respectively connected in the armature and shunt field circuits of said motor and said overload device being calibrated for less sensitiveness than said relay.

7. The combination with a motor having a shunt field winding, of field weakening means therefor providing for acceleration thereof to a predetermined speed and automatic control means to exclude said field weakening means from circuit intermittently during acceleration of the motor to said predetermined speed, said control means including means insuring graduation of the surges of armature current during the period of acceleration.

8. The combination with a motor having a shunt field winding, of field weakening means therefor providing for acceleration thereof to a predetermined speed and automatic control means to exclude said field weakening means intermittently during the accelerating period, said control means including means insuring limitation of the surges of armature current to a graduated increase as the acceleration of the motor progresses.

9. The combination with a motor having a shunt field winding, of field weakening means therefor providing for acceleration thereof to a predetermined speed, and automatic control means to exclude said field weakening means from circuit intermittently during the accelerating period, said control means including means to insure graduated limitation of the surges of armature current according to the contemporaneous field conditions.

10. The combination with a motor having a shunt field winding, of field weakening means therefor providing for acceleration thereof to a predetermined speed, and automatic control means to exclude said field weakening means from circuit intermittently during the period of acceleration, said control means including means insuring limitation of the surges of armature current to values varying conversely to the corresponding values of field current.

11. The combination with a motor having a shunt field winding, of field weakening means therefor providing for acceleration thereof to a predetermined speed and a relay for excluding said field weakening means from circuit intermittently during the accelerating period, said relay having an operating winding responsive to the armature current of said motor and also having means subject to field current variation to vary its sensitiveness of response to armature current within the period of acceleration.

12. The combination with a motor having a shunt field winding, of field weakening means therefor providing for acceleration thereof to a predetermined speed and a relay for excluding said field weakening means from circuit intermittently during the period of acceleration of said motor, said relay having an operating winding responsive to the armature current of said motor and also having means subject to field current variation to decrease its sensitiveness of response to armature current as the acceleration of the motor progresses.

13. The combination with a motor having a shunt field winding, of field weakening means therefor providing for acceleration thereof to a predetermined speed and electro-responsive means controlled jointly by the currents of the armature and field circuits to exclude said field weakening means from circuit at varying armature current values during the period of acceleration.

14. The combination with a motor having a shunt field winding, of field weakening means therefor providing for acceleration thereof to a predetermined speed and electro-responsive means controlled jointly by the current of the armature and field circuits of the motor to exclude said field weakening means intermittently upon progressively increasing surges of armature current.

15. The combination with a motor having a shunt field winding, of field weakening means therefor providing for acceleration thereof to a predetermined speed and a relay to exclude said field weakening means intermittently during the accelerating period, said relay having cumulative operating windings respectively responsive to the armature current and field current of said motor whereby the sensitiveness of said relay to surges of armature current is decreased as the acceleration of the motor progresses.

16. The combination with a motor variable in speed by shunt field regulation, of an overload device to interrupt the circuit of said motor, said device having a control winding connected in the armature circuit of said motor and also having means subjecting the same to variations in sensitiveness to armature current in accordance with the field regulation of said motor.

17. The combination with a motor variable in speed by shunt field regulation, of an overload device having cumulative windings respectively connected in the armature and shunt field circuits of said motor, said windings coöperating for varying the sensitiveness of said overload device in accordance with variations in speed of said motor.

In witness whereof I have hereunto subscribed my name.

CHARLES E. CARPENTER.